(12) United States Patent
Tulkoff et al.

(10) Patent No.: US 8,671,119 B2
(45) Date of Patent: *Mar. 11, 2014

(54) METHOD AND SYSTEM FOR CONTENT MANAGEMENT

(75) Inventors: Michael C. Tulkoff, Austin, TX (US);
Jeffrey M. Collins, Austin, TX (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,310

(22) Filed: Dec. 12, 2011

(65) Prior Publication Data

US 2012/0084267 A1 Apr. 5, 2012

Related U.S. Application Data

(63) Continuation of application No. 12/695,797, filed on Jan. 28, 2010, now Pat. No. 8,234,314, which is a continuation of application No. 10/716,093, filed on Nov. 18, 2003, now Pat. No. 7,676,486.

(60) Provisional application No. 60/472,971, filed on May 23, 2003.

(51) Int. Cl.
*G06F 17/30* (2006.01)

(52) U.S. Cl.
USPC .................... 707/803; 707/809; 707/812

(58) Field of Classification Search
USPC .......................... 707/803, 809, 812
See application file for complete search history.

(56) References Cited

U.S. PATENT DOCUMENTS

| | | | |
|---|---|---|---|
| 5,764,973 A | 6/1998 | Lunceford et al. | |
| 5,787,433 A | 7/1998 | Plotkin et al. | |
| 5,857,194 A | 1/1999 | Kelliher et al. | |
| 6,216,137 B1 | 4/2001 | Nguyen et al. | |
| 6,385,589 B1 | 5/2002 | Trusheim et al. | |
| 6,590,589 B1 | 7/2003 | Sluiman et al. | |
| 6,604,110 B1 | 8/2003 | Savage et al. | |
| 6,826,727 B1 | 11/2004 | Mohr | |
| 6,850,893 B2 | 2/2005 | Lipkin et al. | |
| 6,889,222 B1 | 5/2005 | Zhao | |
| 6,898,609 B2 | 5/2005 | Kerwin | |
| 6,910,040 B2 | 6/2005 | Emmick | |
| 6,999,966 B2 | 2/2006 | Liang et al. | |
| 7,062,705 B1 | 6/2006 | Kirkwood et al. | |

(Continued)

OTHER PUBLICATIONS

Office Action for U.S. Appl. No. 10/716,093, mailed May 1, 2006, 19 pgs.

(Continued)

*Primary Examiner* — Hosain Alam
*Assistant Examiner* — Johnese Johnson
(74) *Attorney, Agent, or Firm* — Sprinkle IP Law Group

(57) ABSTRACT

Systems and methods are described which facilitate content management in a network environment. Content types can be modeled by end users based on data usage and automatically generated by a content management system based on a user-defined data model. From these content types, content type objects may be generated. The data may then be examined to acquire a key set, and a content instance object generated for each datum found which matches a content type. This content instance object can then be associated with the datum using one or more key values, saved, and subsequently used to manage the data. These methods and systems allow data to be migrated to a content management system without any modification to the existing data repository or its associated structures.

20 Claims, 3 Drawing Sheets

(56) References Cited

U.S. PATENT DOCUMENTS

| | | | |
|---|---|---|---|
| 7,069,271 | B1 | 6/2006 | Fadel et al. |
| 7,117,252 | B1 | 10/2006 | Kumakura |
| 7,117,260 | B2 | 10/2006 | Bimson et al. |
| 7,188,332 | B2 | 3/2007 | Charisius et al. |
| 7,236,966 | B1 | 6/2007 | Jackson et al. |
| 7,356,771 | B2 | 4/2008 | Paul et al. |
| 7,415,484 | B1 * | 8/2008 | Tulkoff et al. ............... 1/1 |
| 7,464,099 | B2 | 12/2008 | Irons |
| 7,464,385 | B1 | 12/2008 | Ozor et al. |
| 7,676,486 | B1 | 3/2010 | Tulkoff et al. |
| 7,707,316 | B2 | 4/2010 | Miyazaki |
| 7,752,258 | B2 | 7/2010 | Lewin et al. |
| 8,234,314 | B2 | 7/2012 | Tulkoff |
| 8,510,761 | B2 | 8/2013 | Tulkoff et al. |
| 2002/0049626 | A1 | 4/2002 | Mathias et al. |
| 2002/0055917 | A1 | 5/2002 | Muraca |
| 2002/0111989 | A1 | 8/2002 | Ambler et al. |
| 2002/0124116 | A1 | 9/2002 | Yaung |
| 2002/0138436 | A1 | 9/2002 | Darling |
| 2002/0147644 | A1 | 10/2002 | Subramanian et al. |
| 2002/0152210 | A1 | 10/2002 | Johnson et al. |
| 2002/0157002 | A1 | 10/2002 | Messerges et al. |
| 2002/0180803 | A1 | 12/2002 | Kaplan et al. |
| 2003/0065898 | A1 | 4/2003 | Flamma et al. |
| 2003/0074342 | A1 | 4/2003 | Curtis |
| 2003/0097640 | A1 | 5/2003 | Abrams et al. |
| 2003/0105654 | A1 | 6/2003 | MacLeod et al. |
| 2003/0105770 | A1 | 6/2003 | MacLeod |
| 2003/0120593 | A1 | 6/2003 | Bansal et al. |
| 2003/0149934 | A1 | 8/2003 | Worden |
| 2003/0191752 | A1 | 10/2003 | Fairweather |
| 2003/0195885 | A1 | 10/2003 | Emmick et al. |
| 2003/0195923 | A1 | 10/2003 | Bloch |
| 2003/0204481 | A1 | 10/2003 | Lau |
| 2003/0208397 | A1 | 11/2003 | VanDusen |
| 2003/0208493 | A1 | 11/2003 | Hall et al. |
| 2004/0015908 | A1 | 1/2004 | Giel et al. |
| 2004/0034668 | A1 | 2/2004 | Gotz et al. |
| 2004/0039964 | A1 | 2/2004 | Russell et al. |
| 2004/0054690 | A1 | 3/2004 | Hillerbrand et al. |
| 2004/0054923 | A1 | 3/2004 | Seago et al. |
| 2004/0093323 | A1 | 5/2004 | Bluhm et al. |
| 2004/0107356 | A1 | 6/2004 | Shamoon et al. |
| 2004/0117795 | A1 | 6/2004 | Wang et al. |
| 2004/0122849 | A1 | 6/2004 | Nelson |
| 2004/0161734 | A1 | 8/2004 | Knutson |
| 2004/0187100 | A1 | 9/2004 | Thiruvillamalai |
| 2004/0205075 | A1 | 10/2004 | LaTurner et al. |
| 2004/0236801 | A1 | 11/2004 | Borden et al. |
| 2005/0044103 | A1 | 2/2005 | MacLeod et al. |
| 2005/0138081 | A1 | 6/2005 | Alshab et al. |
| 2006/0059253 | A1 | 3/2006 | Goodman et al. |
| 2006/0195816 | A1 | 8/2006 | Grandcolas et al. |
| 2009/0106779 | A1 | 4/2009 | Tulkoff et al. |
| 2010/0131572 | A1 | 5/2010 | Tulkoff et al. |
| 2013/0283178 | A1 | 10/2013 | Tulkoff et al. |

OTHER PUBLICATIONS

Office Action for U.S. Appl. No. 10/434,936, mailed May 8, 2006, 11 pgs.

Office Action for U.S. Appl. No. 10/716,093, mailed Sep. 18, 2006, 16 pgs.

Office Action for U.S. Appl. No. 10/434,936, mailed Oct. 24, 2006, in 13 pgs.

Office Action for U.S. Appl. No. 10/716,093, mailed Mar. 30, 2007, 19 pgs.

Office Action for U.S. Appl. No. 10/434,936, mailed Apr. 19, 2007, 9 pgs.

Office Action for U.S. Appl. No. 10/716,093, mailed Oct. 15, 2007, 19 pgs.

Office Action for U.S. Appl. No. 10/716,093, mailed Feb. 6, 2008, 21 pgs.

Office Action for U.S. Appl. No. 10/716,093, mailed Oct. 24, 2008, 24 pgs.

Office Action for U.S. Appl. No. 10/716,093, mailed Apr. 14, 2009, 27 pgs.

Office Action for U.S. Appl. No. 12/023,733, mailed Aug. 3, 2010, 27 pgs.

Office Action for U.S. Appl. No. 12/695,797, mailed Jan. 11, 2011, 25 pgs.

Office Action for U.S. Appl. No. 12/023,733, mailed Jan. 20, 2011, 17 pgs.

Office Action for U.S. Appl. No. 12/695,797, mailed Jun. 21, 2011, 26 pgs.

Office Action for U.S. Appl. No. 12/023,733, mailed Jul. 18, 2011, 19 pgs.

Office Action for U.S. Appl. No. 12/023,733, mailed Jan. 7, 2013, 20 pgs.

Notice of Allowance for U.S. Appl. No. 12/695,797, mailed Apr. 6, 2012, 8 pgs.

Notice of Allowance for U.S. Appl. No. 12/023,733, mailed Apr. 18, 2013, 2 pgs.

* cited by examiner

METHOD AND SYSTEM FOR CONTENT MANAGEMENT

CROSS-REFERENCE TO RELATED APPLICATIONS

This application is a continuation of U.S. patent application Ser. No. 12/695,797, filed Jan. 28, 2010 now U.S. Pat. No. 8,234,314, entitled, "METHOD AND SYSTEM FOR FACILITATING MIGRATION OF A COMPUTING ENVIRONMENT," which is a continuation application of U.S. patent application Ser. No. 10/716,093, filed Nov. 18, 2003, now U.S. Pat. No. 7,676,486, entitled "METHOD AND SYSTEM FOR MIGRATION OF LEGACY DATA INTO A CONTENT MANAGEMENT SYSTEM," which claims a benefit of priority under 35 U.S.C. §119(e) to U.S. Provisional Application No. 60/472,971, filed May 23, 2003, entitled "A SYSTEM AND METHOD FOR THE MIGRATION OF LEGACY DATA INTO CONTENT MANAGEMENT DATA OBJECTS." This application is related to U.S. patent application Ser. No. 10/434,936, filed May 9, 2003, entitled "METHOD AND SYSTEM FOR MODELING OF SYSTEM CONTENT FOR BUSINESSES." All applications listed in this paragraph are fully incorporated herein by reference.

TECHNICAL FIELD OF THE INVENTION

This invention relates in general to methods and systems for managing content, and more particularly, to methods and systems for migrating existing data to a content management system using content types modeled on data usage.

BACKGROUND OF THE INVENTION

In a computing environment, data is of the utmost importance. Data is input into a system, manipulated, and commensurately output. Data, or content, is particularly important to a web site, as various forms of content are presented to a visitor to the site. However, as the size of web sites expands, and their functionality increases, managing the content utilized at these websites becomes increasingly more complicated. The amount of content deployed increases rapidly with the expansion of the site, and the organization of, and relationships between, this content is constantly in flux.

To deal with the volume of content, many managers of computer environments, or publishers of websites, may wish to utilize a content management system. Particular foibles of certain content management systems, however, make their use less than ideal. For example, many extant systems do not understand the complex relationships between the content. Other systems may not allow an accurate representation of the varied nature of the content present and the contents' associated attributes and requirements. Some systems provide such an inhospitable environment that their use itself is a barrier to their effectiveness, requiring extensive training in programming and the locale of information to effectively manage content.

A few select content management systems have managed to obviate these problems by using content types to model the content of a site according to the site's own vocabulary. These content types may use the vocabulary and business rules used by a particular enterprise within which the users work. Business data objects may be instantiated from the content types and may include attributes, and workflow, access controls. Content management systems of this ilk allow a layer of abstraction to be fitted to the content which represents the complex relationships between the data in the terms defined by the users.

Consequently, many sites may wish to migrate their data to content management systems of this type. Previous methods for migrating this data to a content management system involved manually entering this data into a proprietary content management repository, defining content types and associating this legacy data with the defined content types. This method was time consuming and expensive, in part because it did not allow the persistence of content management metadata across content management systems and required the migration of data from one repository to the next.

Thus, there is a need for systems and methods of content management that can migrate existing, large data repositories without changing either the structure or the location of the data, while simultaneously allowing any existing content management metadata to be persisted.

SUMMARY OF THE INVENTION

Systems and methods for content management are disclosed. These methods allow data to be integrated into a content management system using content types based on how the data is actually modeled, used and related. A user's existing data may be inspected, and content types created from this data. The user's data can then be associated with these content types. The data is then managed using these content types, obviating any need to manipulate the data itself, or to move the data to an additional repository.

In some embodiments, the content types may be generated by specifying attributes.

In another embodiment, content types may be used to instantiate content instance objects, and these content instance objects associated with the data.

In yet other embodiments, these content instance objects are saved, and the data is managed using these content instance objects.

In another set of embodiments, these content instance objects are associated with the data using keys.

In other similar embodiments, these keys are acquired by querying a database which holds data.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 1 is a diagram of an embodiment of a content management system.

DESCRIPTION OF PREFERRED EMBODIMENTS

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow. A network includes an interconnected set of server and client computers over a publicly available medium (e.g., the Internet) or over an internal (company-owned) system, A user at a client computer may gain access to the network using a network access provider.

The term "content type" is intended to mean a structured definition of an object used to instantiate other objects. The definition may comprise attributes and related data, including workflow, security, status, or other information. The content types can be used for instantiating content type objects and content instance objects.

The term "business content type" is intended to mean a content type defined in terms of a user's business context.

The term "content type object" is intended to mean an instantiation of a particular content type, embodied in a content management system.

The term "content instance object" is intended to mean an instantiation of a content instance and may be associated with a particular content type object or content type.

The term "business user" is intended to mean a person having little, if any, training in computer programming and writing code in a programming language.

Attention is now directed to systems and methods for content management. These systems and methods may be used to migrate existing data from one content management system to another, or to utilize a content management system with previously unmanaged data. Additionally, these systems and methods can utilize automated data analysis procedures to create content types based on a set of data, to acquire the keys and attributes of a set of data, associate this metadata with the legacy data, and persist this metadata for use with a content management system. This metadata in turn allows a content management system to manage legacy data without changing the structure of the data, moving the data to another repository, or manually re-entering the data.

Figure 1:
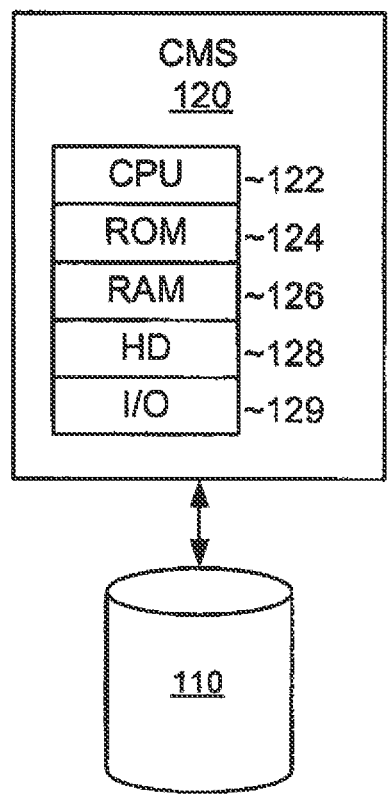

Before discussing embodiments of the invention, an exemplary hardware architecture for using embodiments of the invention is described. FIG. 1 illustrates an exemplary architecture where content management system ("CMS") on computer 120, can be used to manage data residing in database 110. CMS 120 can be bi-directionally coupled to database 110, which may contain data objects and metadata regarding those objects residing in tables within those databases. CMS 120 and database 110 may be part of a network site. Note that FIG. 1 is a simplification of a hardware configuration.

Within CMS 120, a plurality of computers (not shown) may be interconnected to each other via an internal network or a combination of internal and external networks. The computer on which CMS 120 may execute can include central processing unit ("CPU") 122, read-only memory ("ROM") 124, random access memory ("RAM") 126, hard drive ("HD") or storage memory 128, and input/output device(s) ("I/O") 129. I/O 129 can include a keyboard, monitor, printer, electronic pointing device (e.g., mouse, trackball, etc.); or the like.

Additionally; CMS 120 may have one or more of a content delivery software component, a page generator software component, the content management software component, an applications software component, and the like. The data, content, and their metadata, if any, may be located within any or all of, CMS 120, and database 110 or other databases (nor shown).

Portions of the systems and methods described herein may be implemented in suitable software code that may reside within ROM 124, RAM 126 or HD 128. In addition to those types of memories, the instructions in an embodiment of the invention may be contained on a data storage device with a different machine readable storage medium, such as a hard disk. Alternatively, the instructions may be stored as software code elements on a DASD array, magnetic tape, floppy diskette, optical storage device, or other appropriate machine readable medium or storage device.

In an illustrative embodiment of the invention, the machine-executable instructions may be lines of compiled $C^{++}$, Java, or other language code. Other architectures may be used. For example, the functions of any of the systems and methods may be performed by different computers than are shown in FIG. 1. Additionally, a computer program or its software components with such code may be embodied in more than one machine readable medium in more than one computer.

In the hardware configuration above, the various software components (e.g., content delivery, page generator, content management, or the like) may reside on a single computer or on any combination of separate computers. In alternative embodiments, some or all of the software components may reside on the same computer. For example, the content delivery software component and the page generator software component could reside on the same computer.

Figure 2:
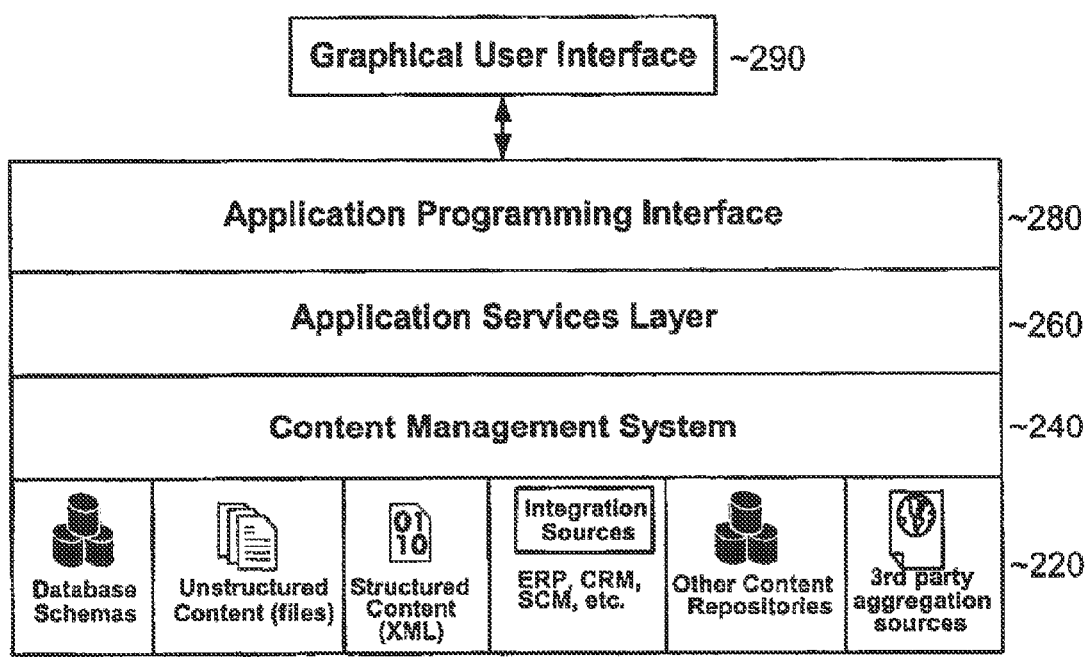
FIG. 2 is a representation of logical layers used in certain content management systems.

Moving on to FIG. 2, a representation of the layered approach taken by many content management systems which utilize content types is depicted. Persistence layer 220 can include all objects, records, metadata for the objects and records, and other data used at a network site (collectively "data"). This data may reside in a variety of persistent data sources such as databases, unstructured content (e.g., text files, image files, etc.), structured content (e.g., XML documents), integration sources (e.g., Enterprise Resource Planning ("ERP"), Customer Relationship Management ("CRM"), Software Configuration Management ("SCM"), etc.), other content repositories, and third party aggregation sources (e.g., news wire services, etc.).

Content management system ("CMS") 240 can control and manage the data within persistence layer 220. Application services layer 260 overlies CMS 240 and provides an interface to CMS 240 that allows operations to be performed on data within persistence layer 220. API 280 overlies application services layer 260. Other APIs to application services layer 260 may be present but are not shown in FIG. 2.

The interfaces from application services layer 260 (to GUI 290) and CMS 240 (to application services layer 260) may be generic. With such a configuration, other user interfaces (not shown) to API 280 may be added with little additional complexity. Also, other software components (not shown) above CMS 240 and at the same level as application services layer 260 may be easily added.

GUI 290 can be coupled to API 280 and allows business users to generate, modify, and delete higher-level objects (i.e., objects that reference or contain other data within persistence layer 220) and allows content types to be generated in a manner consistent with how an enterprise thinks about its content. Because the content types are objects that reside at a higher level compared to records and objects at leaf nodes (i.e., objects that do not refer to other objects), GUI 290 can allow business users to generate, modify, or delete content types without having to know a programming language. GUI 290 can be a user friendly, web-based modeling tool that may be used after little training.

The time from installation of the methods and system described herein to launch of content can be performed much more quickly and at a fraction of the cost (since programmers are not required the time to generate the content types is faster than coding). The content types essentially replace conventional templates that required programmers to code. Further, unlike conventional templates, the content types may have an associated workflow and access controls to allow for a more automated development, processing, deployment of content, and a role-based monitoring system for monitoring the business data objects instantiated from the business content types.

GUI 290 may allow users to model content types in terms of a businesses needs and in a business' own vocabulary. Content types may be thought of as "recipes" for subsequently instantiated objects from those content types. The content type is used to manage instances being created from that content type. The content types can be defined to include attributes and potentially other information. A user may use a graphical user interface or other interface for defining the content type. When the content type is saved, CMS 240 may automatically serialize the input to create a structured definition of the content type that may be persisted in database 110. The structured definition may be in XML. Alternatively, the structured definitions may be generated in a different manner or expressed in a different language.

The content types may be defined in a logical order. More specifically, base or leaf content types may be defined before composite content types. The base or leaf content types do not refer to other any other content type, whereas a composite content type refers to at least one other content type. Simply put, the base or leaf content type should exist for it to be referenced by a composite content type. The content types may include references to one or more content types. Information regarding the content types will be addressed later in this specification.

In one example, a content type of "article" can include a title, an author, an image, and text attributes. The title, image, and text may be at leaf nodes and not refer to any other objects. The author may come from an author table within database 110 and may also be a content type. Therefore, an article content type can be a composite content type because it refers to another content type, namely an author content type. The author content type should be created before the article content type to comply with referential integrity constraints.

The attributes may be used to locate referenced objects, files, and records. One of the attributes may reference a file. If so, the reference can be the file name for the file. For a record from a table in one of the databases 110, the reference can include a reference to a database and the column with primary keys for the database table.

Part of defining content types may include annotating policy information. Predefined policies may be used for deployment, promotion, demotion, packaging, and potentially other purposes may be within the annotations. CMS 240 may include business rules for acting on records, files, and objects to ensure that referential integrity constraints are met. Using the relationship and policy information, CMS 240 may determine which, if any, references are relevant for a particular purpose.

Depending on the policy, different sets of data objects may be significant or insignificant to a particular data object based on the action being considered. Deployment of a proxy object may affect one set of the other data objects (objects lower in the hierarchy or closer to the leaf nodes), whereas, demotion may effect a different set of other data objects (objects higher in the hierarchy or further from the leaf nodes). Therefore, depending on the action, some relationships may be important and others may not.

While this may sound simple, many objects may reference other objects. Therefore, deploying or demoting a data object may cause unintended complications that are undesired. For example, during deployment, the proxy object being deployed may refer to another data object that does not exist because it has previously been removed or never existed. Conversely, demoting a base or leaf node object may cause other consequences for compound objects that include the base or leaf node object.

All of the file, records, and objects within the current object may be thought of as nodes that constitute a graph and reference relationships are represented the arcs of the graph. The arcs may be thought of as being different colors for the different annotations for the various functions (e.g., deployment, demotion, etc.), CMS 240 can traverse the graph and return all the nodes that are encountered for a specific color of arcs. The order of execution for a set of nodes may be a function of the policy being used. Referential integrity constraints between the table for the peripheral row and the primary table of the referenced object may be examined. If there are integrity constraints that need to be enforced, CMS 240 takes that into account when doing the traversal. For deployment, the referenced object should precede the referring object in the ordering result that CMS 240 returns from the traversal.

In addition to logical relationships, physical dependencies may be important. If the order is followed, the integrity constraints in the database will not be violated. Referential integrity constraints in databases should be maintained and are most commonly typified by what are called foreign key-primary key constraints. For example, two different tables may be used. A referenced table has a primary key, and a referencing table has a foreign key with the value of the primary key in the referenced table. If rows are to be inserted into both tables, the referenced table gets its row before the referencing table gets its corresponding row. Performing the insertion in the reverse order violates the integrity restraints. In this manner, a user can describe the data, and CMS 240 will make sure that data gets shepherded properly from stage to stage. Such automation can allow almost any employee of a company to enter data and perform operations without having to address low-level programming concerns.

The content type object can comprise an XML document of a structured definition of the content type. A business user can model the content type based on the content structure desired by the business user. The business user may specify business rules that a content type object or content instance object created from the content type will need to follow, and levels of access to the associated data objects.

GUI 290 may present a user with one or more entry forms. Each attribute in the entry form can include a configurable control with an Extensible Style Language Transformation ("XSLT"). GUI 290 may allow the content types to model complex database relationships, such as one to one (employee/image of employee), one to many (product category/SKUs for products within the product category), and many to many (articles authors).

The content type may have its dependencies managed by containment, reference, or a combination of them. For containment, all data for a content type can be created, updated, deleted, versioned, associated, staged (put through a workflow), and published (deployed) as a single entity. As an example, a content type may contain several different records that are parts of different databases. For reference, all objects referenced within a content instance object (instantiated from the content type) may or may not be processed together. If a referenced object has already been deployed, it may not be re-deployed when the content instance object referencing it is deployed.

GUI 290 can be configured to include many extensibility points. For instance, an XML Schema Definition ("XSD") can be added. XSD can be a structured definition for a valid XML document in lieu of a Document Type Definition ("DTD"). XSD allows a user to define complex data types for the document. The content type can be generated so that it overrides a content management applications presentation for a Java Server Page ("JSP"). Custom controls may be added to allow data selection from other data sources. A default workflow process can be associated with each content type.

Figure 3:
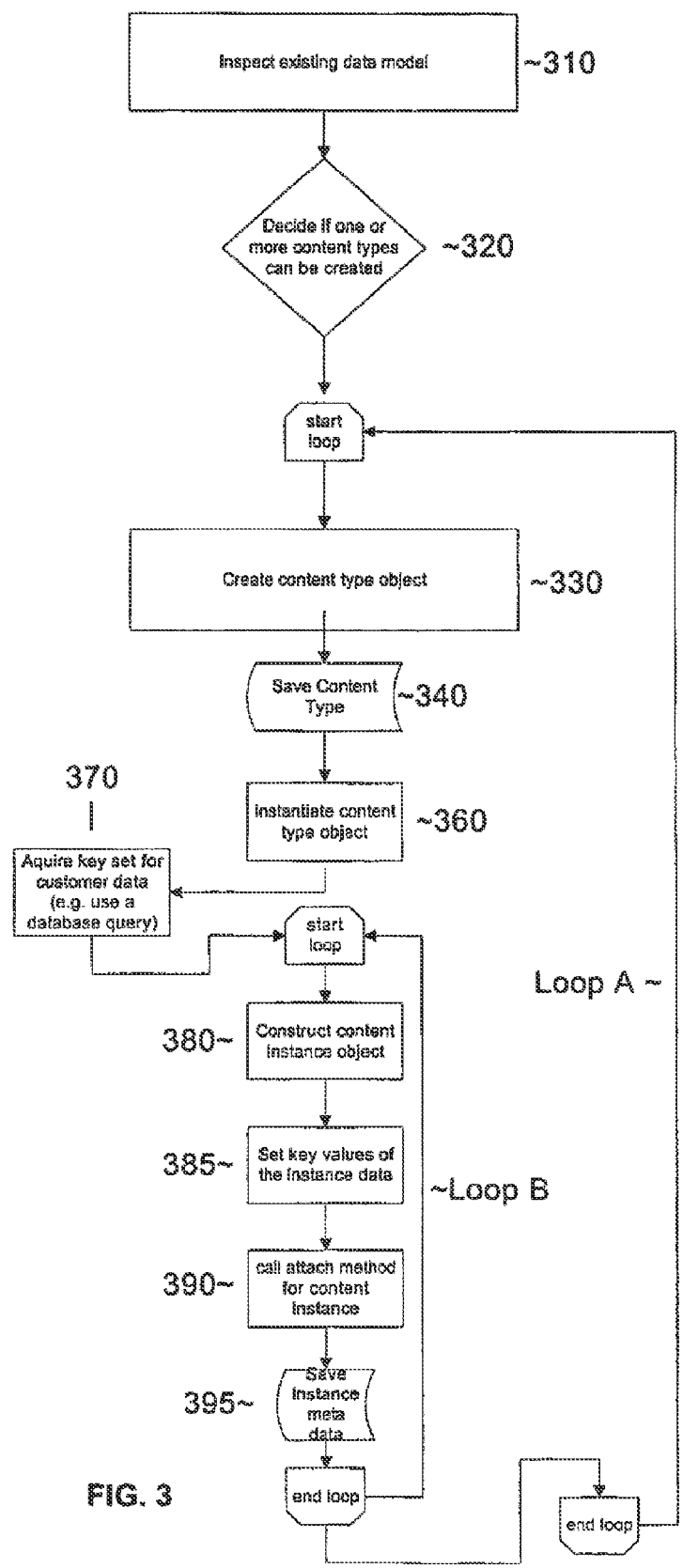
FIG. 3 is a flow diagram of an embodiment of a method of migrating legacy data to a content management system.

Turning now to FIG. 3, one embodiment of a method for using these aforementioned content types to integrate legacy data into a content management system of the type described above is depicted. Generally this is accomplished by inspecting the data to generate a set of content types 310, 320, which can be used to represent the data to be migrated. These content types can be persisted (saved) 340 and used to instantiate content type objects 330. These content types can then be used to instantiate content instance objects 350, 380 which in turn can have their key values set 385, and be attached to particular data 390. These content instance objects can then be persisted 395 to allow a CMS 240 to manage the legacy data without manipulating it directly.

Thus, existing user data can be migrated to a content management system using content types via an attach methodology. In one embodiment, step one in the process is the inspection of the schema and identification of the relationship. Step two is the creation of content type object(s) to model the existing user schema. Step three is an automated task to create content instance objects (content items) of the relevant types. Step four uses an attach method to take over the existing data by associating the data with content instance objects. The following is an example of the migration using the described embodiment: The user has a simple article table with an id, title, and body. The table has 10,000 rows in it and the user want to migrate to Athena. The user creates a content type called "Article" with three attribute definitions and a single top relation. The user may then runs a Java program that instantiates the article type, and iterates over the 10,000 articles to be created. Within the loop, the article factory is used to create a content object instance (the user may supply the primary key of the article when constructing the instance), the attach method is used to take over the data, and the content instance object is persisted. Any default workflow defined at the type level will fire when the instance is committed.

Embodiments of the invention involve attaching to existing legacy data when, typically, a model of the data resides in a relational database or with some repository. In one embodiment, the invention facilitates mapping that legacy data onto a new content management structure that has content types defined for that user data and is designed to keep associated metadata related to content management. Instead of having to import all of the legacy data into a proprietary repository or something similar, the user can merely create content types based on the data users' existing model and then use an attach method to allow the new system to take over management of their existing data.

More specifically, embodiments of the method for migration of data may begin with the inspection of a user's model 310, 320 to take inventory of the data. This analysis may involve an analysis of a user's or customer's business, the type of data that the business requires the user to keep, the attributes the data must have and the way in which the data is stored, utilized, and related. This inspection allows a gathering of the requirements for the content types to be generated. For example, a data model could include articles, authors, images and relationships between those entities.

At this point it can be decided if content types can be created for the data set 320 which would facilitate the management of the data, and allow relations between the data to be expressed. If content types can be defined, a content type object must be created for each content type discerned within the data inspected. For each of those content types, data can then be found which falls under the rubric of that content type. The content type can be used to instantiate a content type object 330 which can in turn be used to instantiate a constant instance 380 that can be attached to a piece of data 340 and persisted 395 (Loop A).

For each content type discovered 320 within the data to be migrated, first a content type object must be created 330. In some embodiments, these content type objects may be created using a content modeler presented by a GUI 290 as described above. The content type can then be persisted in the content management system to which we are migrating by saving the content type 340. Each content type may then be iterated over to instantiate a content type object 360, and create content instance objects 380 (Loop B).

Embodiments of the invention may iterate over the content types persisted. For each content type that is persisted, a content type object is instantiated 360. For each of these content type objects, the data to be migrated can then be analyzed, and for each piece of data which falls under the rubric of that content type a content instance object can be created 380. In one particular embodiment, a key set for the data is acquired by analyzing the set of data to be migrated 370.

This key set may be acquired manually, or may be generated automatically by utilizing a set of database queries. After the key set for the data is acquired 370, the data can then be further analyzed to see which pieces of data match a content type. When data is found which matches a content type, a content instance object may be constructed 380. This can involve looking at the content type and using the content type object to instantiate a content instance object based on the content type. In some embodiments, a Java program can be used to automatically locate data which match a content type and create the content instance objects for this data which match a content type.

After the content instance object is created, the key values of the content instance object can be set to match or represent the key values of the data 385. This content instance object with the key values set can then be associated or attached to the particular piece of data which the content instance object represents 390. In many embodiments, this is done with a method, which is part of the content instance class from which a particular content instance object is instantiated. This attach method allows key values or an identifier to be assigned to the content instance object and the object associated with a particular piece of data. This content instance object can then be persisted 395 by the content management system. Data can then be managed by CMS 240 using these saved content instance objects. In this way, data from a legacy database can be integrated in a content management system without the need to manually enter the data to the content management system, or to modify the legacy data in any way.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems; and any component(s) that may cause any benefit, advantage, or solution to occur or become more pronounced are not to be construed as a critical, required, or essential feature or component of any or all the claims.

The invention claimed is:

1. A method, comprising:
    storing in a memory by a content management system running on at least one server machine, a content type in the content management system;
    generating, by the content management system, a content type object from the content type;
    receiving a key set for content residing in a legacy data repository communicatively connected to the content management system;
    determining from the content, data that matches the content type, the data having key values;
    using the content type object to generate a content instance object based on the content type;
    associating the content instance object with the data by associating key values of the content instance object with the key values of the data; and
    storing the content instance object by the content management system for managing the data, thereby eliminating or reducing a need to modify the data residing in the legacy data repository or manually enter the data into the content management system.

2. The method according to claim 1, further comprising:
    managing the data residing in the legacy data repository using the content instance object including comparing content instance object key values to data key values and identifying the content instance object to manage based on associated key values, and managing the content instance object in place of managing the data in the legacy data repository.

3. The method according to claim 1, further comprising:
    inspecting the content residing in the legacy data repository to generate the content type.

4. The method according to claim 3, wherein the inspecting further comprises inspecting a schema or data model.

5. The method according to claim 1, further comprising:
    presenting a user interface for creating the content type on a client device communicatively connected to the content management system.

6. The method according to claim 1, wherein the associating further comprises using an attach method that is part of a content instance class from which the content instance object is instantiated.

7. The method according to claim 1, wherein the key values of the data represent an identifier for the data.

8. A computer program product comprising at least one non-transitory computer readable medium storing instructions translatable by a server machine to perform:
    storing in a memory by a content management system running on the server machine, a content type in the content management system;
    generating, by the content management system, a content type object from the content type;
    receiving a key set for content residing in a legacy data repository communicatively connected to the content management system;
    determining from the content, data that matches the content type, the data having key values;
    using the content type object to generate a content instance object based on the content type;
    associating the content instance object with the data by associating key values of the content instance object with the key values of the data; and
    storing the content instance object by the content management system for managing the data, thereby eliminating or reducing a need to modify the data residing in the legacy data repository or manually enter the data into the content management system.

9. The computer program product of claim 8, wherein the instructions are further translatable by the server machine to perform:
    managing the data residing in the legacy data repository using the content instance object including comparing content instance object key values to data key values and identifying the content instance object to manage based on associated key values, and managing the content instance object in place of managing the data in the legacy data repository.

10. The computer program product of claim 8, wherein the instructions are further translatable by the server machine to perform:
    inspecting the content residing in the legacy data repository to generate the content type.

11. The computer program product of claim 10, wherein the inspecting further comprises inspecting a schema or data model.

12. The computer program product of claim 8, wherein the instructions are further translatable by the server machine to perform:
    presenting a user interface for creating the content type on a client device communicatively connected to the content management system.

13. The computer program product of claim 8, wherein the associating further comprises using an attach method that is part of a content instance class from which the content instance object is instantiated.

14. The computer program product of claim 8, wherein the key values of the data represent an identifier for the data.

15. A system, comprising:
- a processor; and
- at least one non-transitory computer readable medium storing instructions translatable by the processor to perform:
  - storing a content type in the system;
  - generating a content type object from the content type;
  - receiving a key set for content residing in a legacy data repository communicatively connected to the system;
  - determining from the content, data that matches the content type, the data having key values;
  - using the content type object to generate a content instance object based on the content type;
  - associating the content instance object with the data by associating key values of the content instance object with the key values of the data; and
  - storing the content instance object in the system for managing the data, thereby eliminating or reducing a need to modify the data residing in the legacy data repository or manually enter the data into the system.

16. The system of claim 15, wherein the instructions are further translatable by the processor to perform:
managing the data residing in the legacy data repository using the content instance object including comparing content instance object key values to data key values and identifying the content instance object to manage based on associated key values, and managing the content instance object in place of managing the data in the legacy data repository.

17. The system of claim 15, wherein the instructions are further translatable by the processor to perform:
- inspecting the content residing in the legacy data repository to generate the content type.

18. The system of claim 17, wherein the inspecting further comprises inspecting a schema or data model.

19. The system of claim 15, wherein the instructions are further translatable by the processor to perform:
- presenting a user interface for creating the content type on a client device communicatively connected to the system.

20. The system of claim 15, wherein the associating further comprises using an attach method that is part of a content instance class from which the content instance object is instantiated.

* * * * *